US007747585B2

(12) United States Patent
Barsness et al.

(10) Patent No.: US 7,747,585 B2
(45) Date of Patent: *Jun. 29, 2010

(54) PARALLEL UNCOMPRESSION OF A PARTIALLY COMPRESSED DATABASE TABLE DETERMINES A COUNT OF UNCOMPRESSION TASKS THAT SATISFIES THE QUERY

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 292 days.

This patent is subject to a terminal disclaimer.

(21) Appl. No.: 11/834,842

(22) Filed: Aug. 7, 2007

(65) Prior Publication Data

US 2009/0043793 A1    Feb. 12, 2009

(51) Int. Cl.
G06F 17/00 (2006.01)
G06F 17/30 (2006.01)
H04N 7/14 (2006.01)
H04N 5/445 (2006.01)
(52) U.S. Cl. .............. 707/693; 707/687; 707/758; 707/768; 348/14.13; 348/568
(58) Field of Classification Search .......... 707/1–3, 707/100–101, 103 Y, 103 Z, 687, 693, 758, 707/768; 704/500, 502; 348/14.13, 568; 382/166, 232–235, 243–244
See application file for complete search history.

(56) References Cited

U.S. PATENT DOCUMENTS

| | | | | |
|---|---|---|---|---|
| 5,742,806 A | * | 4/1998 | Reiner et al. | 707/3 |
| 5,794,229 A | * | 8/1998 | French et al. | 707/2 |
| 5,893,102 A | * | 4/1999 | Maimone et al. | 707/101 |
| 5,918,225 A | * | 6/1999 | White et al. | 707/3 |
| 5,930,466 A | * | 7/1999 | Rademacher | 358/1.15 |
| 5,946,692 A | * | 8/1999 | Faloutsos et al. | 707/101 |
| 6,343,293 B1 | * | 1/2002 | Lyle | 707/101 |

(Continued)

FOREIGN PATENT DOCUMENTS

WO    WO 00/21022    *    4/2000

(Continued)

OTHER PUBLICATIONS

Meikel Poess et al "Data Compression in Oracle", Proceedings of the 29 th VLDB Conference,, pp. 937-947.*

(Continued)

*Primary Examiner*—Srirama Channavajjala
(74) *Attorney, Agent, or Firm*—Martin & Associates, LLC; Derek P. Martin

(57) ABSTRACT

A multiprocessing uncompression mechanism takes advantage of existing multiprocessing capability within a database to perform dynamic uncompression of portions of a partially compressed database table that satisfy a query using processes that may be executed in parallel. Historical information is gathered for each query. Uncompression advice includes user-specified parameters that determine how the multiprocessing uncompression mechanism functions. The multiprocessing uncompression mechanism processes the historical information and uncompression advice to determine an appropriate task count for performing uncompression in parallel processes. The existing multiprocessing capability within the database then processes the tasks that perform the uncompression in parallel.

4 Claims, 7 Drawing Sheets

U.S. PATENT DOCUMENTS

| | | | |
|---|---|---|---|
| 6,374,250 B2 * | 4/2002 | Ajtai et al. | 707/101 |
| 6,549,995 B1 * | 4/2003 | Schulz et al. | 711/202 |
| 6,577,254 B2 * | 6/2003 | Rasmussen | 341/51 |
| 6,691,132 B2 * | 2/2004 | Walker et al. | 707/102 |
| 6,766,334 B1 * | 7/2004 | Kaler et al. | 707/203 |
| 7,050,639 B1 * | 5/2006 | Barnes et al. | 382/239 |
| 7,058,783 B2 * | 6/2006 | Chandrasekaran et al. | 711/171 |
| 7,103,608 B1 * | 9/2006 | Ozbutun et al. | 707/102 |
| 7,113,936 B1 | 9/2006 | Michel et al. | |
| 7,127,449 B2 * | 10/2006 | Barsness et al. | 707/2 |
| 7,181,457 B2 | 2/2007 | Reinauer et al. | |
| 7,216,291 B2 | 5/2007 | Kim | |
| 7,480,643 B2 * | 1/2009 | Barsness et al. | 707/2 |
| 2001/0054131 A1 * | 12/2001 | Alvarez et al. | 711/105 |
| 2003/0028509 A1 * | 2/2003 | Sah et al. | 707/1 |
| 2005/0015374 A1 | 1/2005 | Reinauer et al. | |
| 2005/0160074 A1 | 7/2005 | Vos et al. | |
| 2006/0123035 A1 | 6/2006 | Ivie | |
| 2008/0071818 A1 | 3/2008 | Apanowicz et al. | |
| 2008/0162523 A1 | 7/2008 | Kraus et al. | |
| 2009/0043734 A1 * | 2/2009 | Barsness et al. | 707/3 |
| 2009/0043792 A1 * | 2/2009 | Barsness et al. | 707/101 |

FOREIGN PATENT DOCUMENTS

| | | | |
|---|---|---|---|
| WO | WO 02/093455 | * | 11/2002 |
| WO | WO 03/096230 | * | 11/2003 |
| WO | WO 2008/009135 | * | 1/2008 |

OTHER PUBLICATIONS

Jonathan Goldstein et al. "Compressing Relations and Indexes", Data Engineering, 1998. Proceedings., 14th International Conference, Feb. 23-27, 1998, pp. 370-379.*

* cited by examiner

Uncompression Advice Table 700

| Query ID 702 | App ID 704 | Client ID 706 | Job ID 708 | User ID 710 | Parallel Select 712 | Parallel Where 714 | Force Select 716 | Force Where 718 | CPU 720 | Mem 722 | IO 724 | CPU 726 | Mem 728 | IO 730 | Max Time 732 |
|---|---|---|---|---|---|---|---|---|---|---|---|---|---|---|---|
| ... | ... | ... | ... | ... | ... | ... | ... | ... | ... | ... | ... | ... | ... | ... | ... |
| | | | | | | | | | | | | | | | |

FIG. 7

PARALLEL UNCOMPRESSION OF A PARTIALLY COMPRESSED DATABASE TABLE DETERMINES A COUNT OF UNCOMPRESSION TASKS THAT SATISFIES THE QUERY

CROSS-REFERENCE TO RELATED APPLICATIONS

This patent application is related to the following U.S. Patent Applications: "PARTIAL COMPRESSION OF A DATABASE TABLE BASED ON HISTORICAL INFORMATION", Ser. No. 11/834,837, filed on Aug. 7, 2007; and "DYNAMIC PARTIAL UNCOMPRESSION OF A DATABASE TABLE", Ser. No. 11/834,840, filed on Aug. 7, 2007. Both of these related patent applications are incorporated herein by reference.

BACKGROUND

1. Technical Field

This disclosure generally relates to computer systems, and more specifically relates to database systems.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database. Retrieval of information from a database is typically done using queries. A database query typically includes one or more predicate expressions interconnected with logical operators.

Database compression has been known for some time as a way to reduce the size of a table that is not often used. In the prior art, if compression is performed, it is performed on an entire database table. Once a table is compressed, it cannot be queried until it is uncompressed. If the data in the table is then needed, the entire table must be uncompressed, then a query may be executed to access data in the table. The cost in processor overhead of compressing and uncompressing a database table can be significant, especially for large tables. For this reason, compression/uncompression schemes have typically been limited to applications when the likelihood of needing data that has been compressed is low.

The first related application referenced above provides a way to partially compress a portion of a database table without compressing all of the database table. Portions that may be compressed include columns, parts of columns, and rows. When a database table has one or more compressed portions, the issue now arises regarding how to deal with the compressed portions. The second related application referenced above provides a way to perform dynamic partial uncompression of a partially compressed database table as queries are executed. However, neither of these discuss performing partial uncompression of a partially compressed database table in parallel. Without a way to perform uncompression of portions of a partially compressed database table in parallel when executing a query, the performance of queries that result in dynamic uncompression of data will be limited.

BRIEF SUMMARY

A multiprocessing uncompression mechanism takes advantage of existing multiprocessing capability within a database to perform dynamic uncompression of portions of a partially compressed database table that satisfy a query using processes that may be executed in parallel. Historical information is gathered for each query. Uncompression advice includes user-specified parameters that determine how the multiprocessing uncompression mechanism functions. The multiprocessing uncompression mechanism processes the historical information and uncompression advice to determine an appropriate task count for performing uncompression in parallel processes. The existing multiprocessing capability within the database then processes the tasks that perform the uncompression in parallel.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 7 is a sample table that shows uncompression advice specified by a user that the multiprocessing uncompression mechanism uses to determine how to perform uncompression of one or more portions of a partially compressed database table that satisfy a query;

DETAILED DESCRIPTION

The claims and disclosure herein provide a way to uncompress one or more compressed portions of a database table using multiple tasks that may be executed in parallel by the database system. Historical information is gathered for previous query executions. Uncompression advice allows the user to specify parameters that affect the number of parallel tasks to use for uncompression. When parallel processing is enabled, the historical information and uncompression advice are processed, current system performance is determined, and an appropriate number of parallel tasks for uncompression is then determined. Existing parallelism in the database may then process these uncompression tasks in parallel, resulting in improved performance in uncompressing due to the multiple tasks executing in parallel.

The disclosure and claims herein take advantage of existing parallelism that exists in known database systems. For example, the DB2 database system developed by IBM Corporation includes parallelism that is called Symmetric Multiprocessing. Symmetric Multiprocessing, when enabled, allows multiple tasks to be performed in parallel. For example, if a large index needs to be built, two different parts of the index may be built by two parallel tasks using symmetric multiprocessing. Once the two parallel tasks are complete, the results may be merged to generate the large index from the two pieces that were generated in parallel tasks.

The disclosure and claims herein recognize that the existing parallelism in a database system, such as Symmetric Multiprocessing in a DB2 database system, may be used in a novel and non-obvious way to perform uncompression of compressed portions of a database table in parallel tasks. By defining tasks to perform uncompression in parallel, the performance of the uncompression operation is improved. While existing parallelism in a database has been used to divide a query into parts for parallel execution, it has never been used to uncompress portions of a database table to speed up execution of a query, primarily because a known database table in the prior art that is compressed cannot be queried, as discussed below with reference to FIG. 3.

Figure 1:
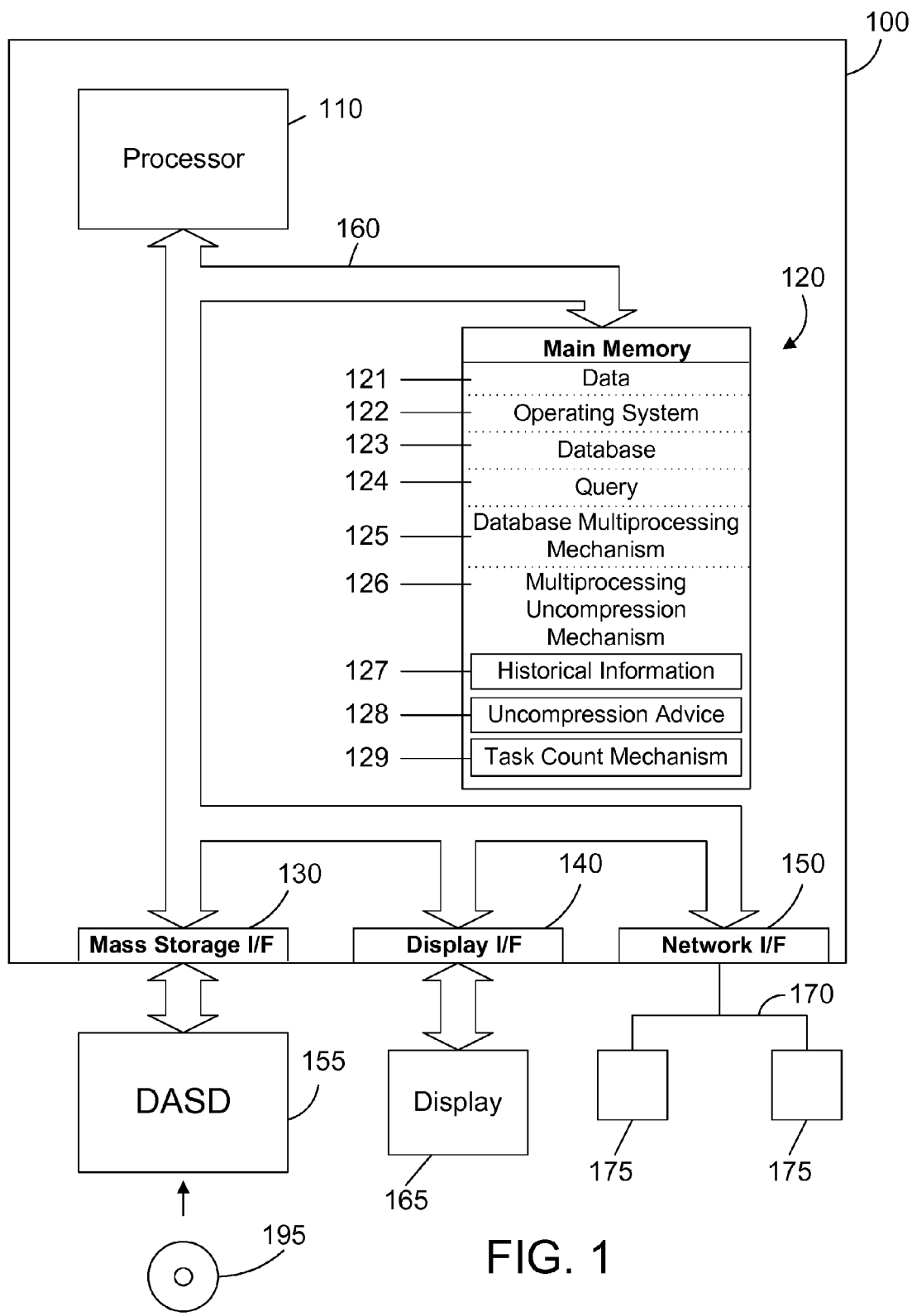
FIG. 1 is a block diagram of an apparatus that performs uncompression of a partially compressed database table using multiple tasks that are processed in parallel.

Referring to FIG. 1, a computer system 100 is one suitable implementation of a computer system that includes a multiprocessing uncompression mechanism that dynamically uncompresses a portion of a database table using parallel tasks when the compressed portion satisfies a query. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122, a database 123, a query 124, a database multiprocessing mechanism 125, and a multiprocessing uncompression mechanism 126. Data 121 represents any data that serves as input to or output from any program in computer system 100. Operating system 122 is a multitasking operating system known in the industry as i5/OS; however, those skilled in the art will appreciate that the spirit and scope of this disclosure is not limited to any one operating system. Database 123 is any suitable database, whether currently known or developed in the future. Database 123 preferably includes one or more tables that have one or more compressed portions and one or more uncompressed portions. Query 124 is any suitable database query, including an SQL query.

Database multiprocessing mechanism 125 provides for parallel execution of tasks in a database system. One suitable example of database multiprocessing mechanism 125 is Symmetric Multiprocessing in a DB2 database system. Of course, other multiprocessing mechanisms for database systems are within the scope of the disclosure and claims herein, whether currently known or developed in the future.

Multiprocessing uncompression mechanism 126 is used to define an appropriate number of tasks for performing uncompression. These tasks are managed and executed by the database multiprocessing mechanism 125. The multiprocessing uncompression mechanism 126 includes a task count mechanism 129 that reads historical information 127 related to previous executions of queries, reads uncompression advice 128 that includes one or more parameters specified by a user, determines current system performance, and from this information determines an appropriate number of uncompression tasks. Once the uncompression tasks are defined, they are preferably executed in parallel by the database multiprocessing mechanism 125. Defining uncompression tasks that may be executed in parallel by database multiprocessing mechanism 125 provides a way to speed up the uncompression of data that satisfies query 124.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, query 124, database multiprocessing mechanism 125, and multiprocessing uncompression mechanism 126 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that a multiprocessing uncompression mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/ or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

At this point, it is important to note that while the description above is in the context of a fully functional computer system, those skilled in the art will appreciate that the multiprocessing uncompression mechanism may be distributed as an article of manufacture in a variety of forms, and the claims extend to all suitable types of computer-readable media that bear instructions that may be executed by a computer. Examples of suitable computer-readable media include recordable media such as floppy disks and CD-RW (e.g., 195 of FIG. 1).

The multiprocessing uncompression mechanism may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
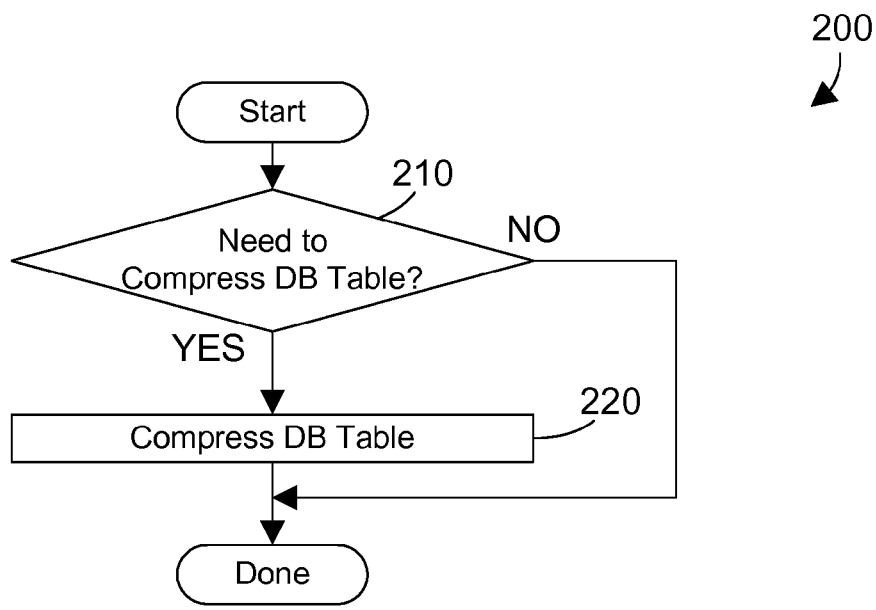
FIG. 2 is a flow diagram of a prior art method for compressing an entire database table.

Referring to FIG. 2, a flow diagram of a method 200 shows how compression of a database table is performed in the prior art. If there is a need to compress a database table (step 210=YES), the entire database table is compressed (step 220). If there is no need to compress the database table (step 210=NO), the table is not compressed. In the prior art, compression was only done on a table basis. Nowhere does the prior art show compression of a portion of a database table without compressing all of the database table.

Figure 3:
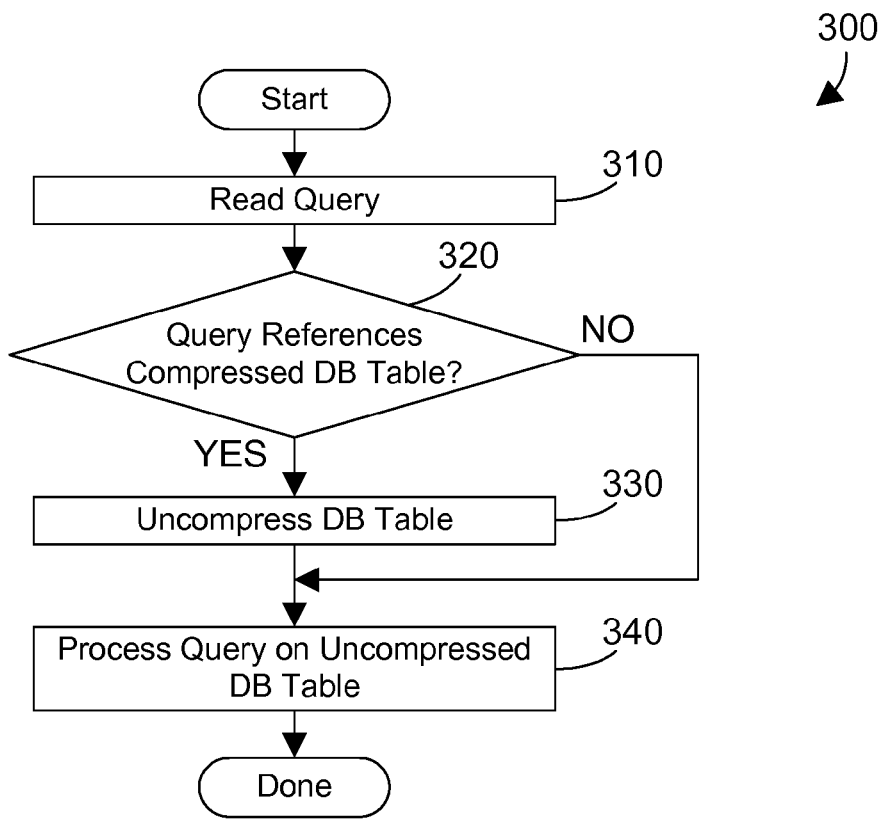
FIG. 3 is a flow diagram of a prior art method for processing a query.

Referring to FIG. 3, a flow diagram of a method 300 shows how a query is processed in the prior art. A query is read (step 310). If the query does not reference a compressed database table (step 320=NO), the query is processed on the uncompressed database table (step 340). If the query references a compressed database table (step 320=YES), the entire database table is uncompressed (step 330), and the query is then processed on the uncompressed database table (step 340). FIGS. 2 and 3 illustrate that compression and decompression in a known database is done on a table-by-table basis. A query can only be processed on an uncompressed table. If a table needs to be compressed, all portions of the table are compressed. If a compressed table needs to be queried, the entire table must be uncompressed, then the uncompressed table may be queried. Because of the relatively high processing cost associated with compressing an entire table, then uncompressing the entire table when a query references the table, database compression is typically reserved for those applications when it is relatively unlikely that a table will be used. The result is the benefits of compression are not fully realized when compressing database tables in the prior art.

Figure 4:
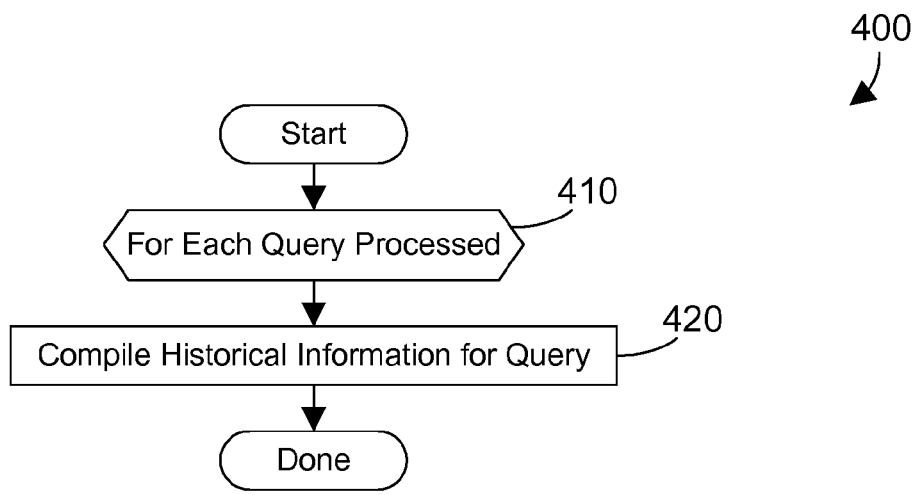
FIG. 4 is a flow diagram of a method for compiling historical information when queries are processed.

The first related application referenced above discloses a way to compress one or more portions of a database table without compressing all portions of the database table. Methods disclosed in the first related application include methods 400 and 500 in FIGS. 4 and 5, respectively. Referring to FIG. 4, a method 400 shows how historical information may be gathered. For each query processed (step 410), the historical information for the query is compiled (step 420). Note that historical information may include any suitable historical information that may help determine whether or not to partially compress a database table. For example, in one suitable implementation, the historical information includes a separate file for each database table, with the historical information relating to a table being stored in that table's corresponding file. In another example, historical information may include details of all queries executed, along with information regarding which portions of each database table were referenced by each query.

Figure 5:
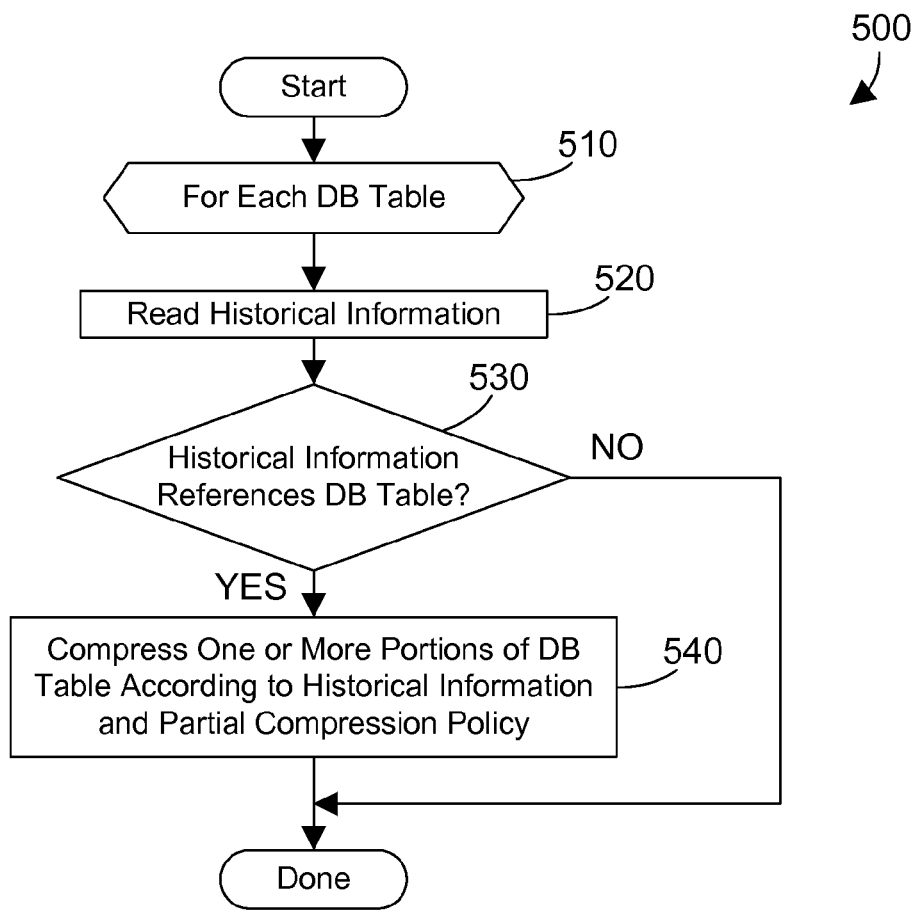
FIG. 5 is a block diagram of a method for compressing one or more portions of a database table based on historical usage information and based on a partial compression policy specified by a user.

Method 500 in FIG. 5 shows how the historical information collected in FIG. 4 may be used to compress one or more portions of a database table without compressing all portions of the database table. For each database table (step 510), the historical information is read (step 520). If the historical information does not reference the specific database table of interest (step 530=NO), method 500 is done. If the historical information references the database table (step 530=YES), one or more portions of the database table may be compressed according to the historical information and optionally according to a partial compression policy (step 540).

Once a database table has some portions uncompressed and other portions compressed after executing method 500 in FIG. 5, now the issue arises of how to deal with a database table that is partially compressed. The second related application cited above shows one way to perform dynamic uncompression during the execution of a query of the portions of a database table that satisfy the query. The disclosure and claims herein build upon this concept by recognizing that dynamic uncompression during the execution of a query may be performed by multiple uncompression tasks executing in parallel.

Figure 6:
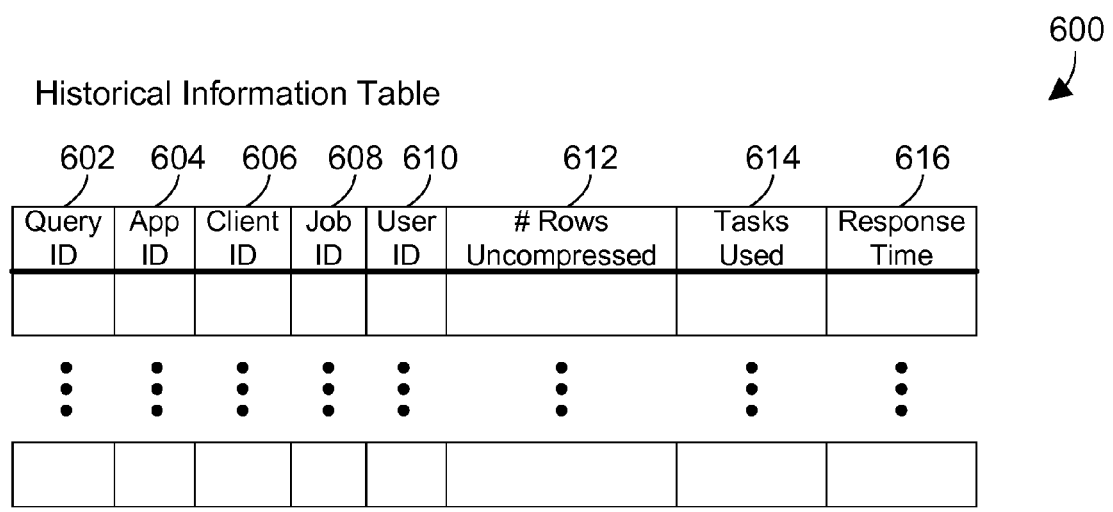
FIG. 6 is a sample table that includes historical information regarding past execution of queries.

Referring to FIG. 6, a historical information table 600 is one suitable implementation for historical information 127 shown in FIG. 1. The historical information preferably specifies information relating to one or more past executions of one or more queries. Historical information table 600 includes a query ID column 602, an application ID column 604, a client ID column 606, a job ID column 608, a user ID column 610, a number of rows uncompressed column 612, a tasks used column 614, and a response time column 616. Each entry in the historical information table includes entries in one or more of these columns. The query ID column 602 includes an identifier that uniquely identifies the query. The application ID column 604 includes an identifier that uniquely identifies the application that called the query. The client ID column 606 includes an identifier that uniquely identifies the client that called the query. The job ID column 608 includes an identifier that uniquely identifies the job that called the query. The number of rows uncompressed column 612 indicates how many of the rows in the result set for the query were uncompressed. The tasks used column 614 specifies how many uncompression tasks were used in executing the query. The response time column 616 specifies how long it took to execute the query. In one preferred implementation for table 600 shown in FIG. 6, each query execution is logged as a unique entry in the historical information table 600. Note, however, that other implementations are also possible. For example, if a particular query is executed three times by the same application, client, job and user, the results of the three executions could be averaged in columns 612, 614 and 616 to allow the historical information for a particular query executed by the same application, client, job and user to be in a single entry in the historical information table instead of in multiple entries. The historical information table 600 is preferably read by the task count mechanism 129 to help in determining an appropriate number of parallel uncompression tasks.

Referring to FIG. 7, an uncompression advice table 700 is one suitable implementation for the uncompression advice 128 shown in FIG. 1. Uncompression advice table 700 includes a query ID column 702, an application ID column 704, a client ID column 706, a job ID column 708, a user ID column 710, a parallel select column 712, a parallel where column 714, a force select column 716, a force where column 718, a CPU column 720, a memory column 722, an IO column 724, a CPU column 726, a memory column 728, an IO column 730, and a maximum time column 732. The columns 702-710 for query ID, application ID, client ID, job ID and user ID may each contain unique identifiers, as discussed above in reference to FIG. 6. The parallel select column 712 specifies whether or not the database portions that satisfy the "select" portion of the query may be uncompressed in parallel. The parallel where column 714 specifies whether or not the database portions that satisfy the "where" portion of the query may be processed in parallel. The force select column 716 allows the user to specify a number of tasks for parallel uncompression of database portions that satisfy the "select" portion of the query.

The force where column 718 allows the user to specify a number of tasks for parallel uncompression of database portions that satisfy the "where" portion of the query. The CPU column 720, memory column 722, and IO column 724 pertain to the "select" portion of the query, and contain specifications entered by the user to set thresholds for the CPU, memory and IO that determine when the portions of the database table that satisfy the "select" portion of the query may be uncompressed in parallel. For example, if the parallel select column 712 enables parallel uncompression of portions that satisfy the "select" portion of the query, and if the CPU column 720 has a specification of 75%, the memory column 722 has a specification of 2 GB, and the IO column 724 has a specification of 10 IO operations per second, this means multiple tasks may perform the uncompression in parallel as long as the CPU utilization is less than 75%, the memory utilization is less than 2 GB, and the IO utilization is less than 10 IO operations per second. If any of these thresholds are satisfied, the parallel uncompression will be stopped. Once stopped, the result set for the query may be returned, which may include compressed data if the uncompression was stopped before it could complete.

The CPU column 726, memory column 728, and IO column 730 pertain to the "where" portion of the query, and contain specifications entered by the user to set thresholds for the CPU, memory and IO that determine when the portions of the database table that satisfy the "where" portion of the query may be uncompressed in parallel. For example, if the parallel where column 714 enables parallel uncompression of portions that satisfy the "where" portion of the query, and if the CPU column 726 has a specification of 75%, the memory column 728 has a specification of 2 GB, and the IO column 730 has a specification of 10 IO operations per second, this means multiple tasks may perform the uncompression in parallel as long as the CPU utilization is less than 75%, the memory utilization is less than 2 GB, and the IO utilization is less than 10 IO operations per second. If any of these thresholds are satisfied, the parallel uncompression will be stopped. Once stopped, the result set for the query may be returned, which may include compressed data if the uncompression was stopped before it could complete.

A maximum time column 732 may be used to specify the maximum time for parallel uncompression. In the specific implementation shown in FIG. 7, the maximum time column 732 specifies a maximum time that applies to both "select" and "where" parallel processing. However, one skilled in the art will recognize that table 700 could include separate maximum time specifications for the "select" and "where" parallel processing. The maximum time column 732 is used to set a time limit for parallel uncompression. If the parallel uncompression is not completed by the time the maximum time 732 is satisfied, the parallel uncompression is stopped. The results of the query that may include both uncompressed portions and compressed portions may then be returned to the user. Note the CPU columns 720 and 726, the memory columns 722 and 728, the IO columns 724 and 730, and the maximum time column 732 each represent a threshold that may stop parallel uncompression if any of these thresholds are satisfied. In addition, other heuristics could be used to determine when to stop parallel uncompression when two or more of the thresholds are satisfied or any heuristic is satisfied that is based on one or more of the thresholds.

Figure 8:
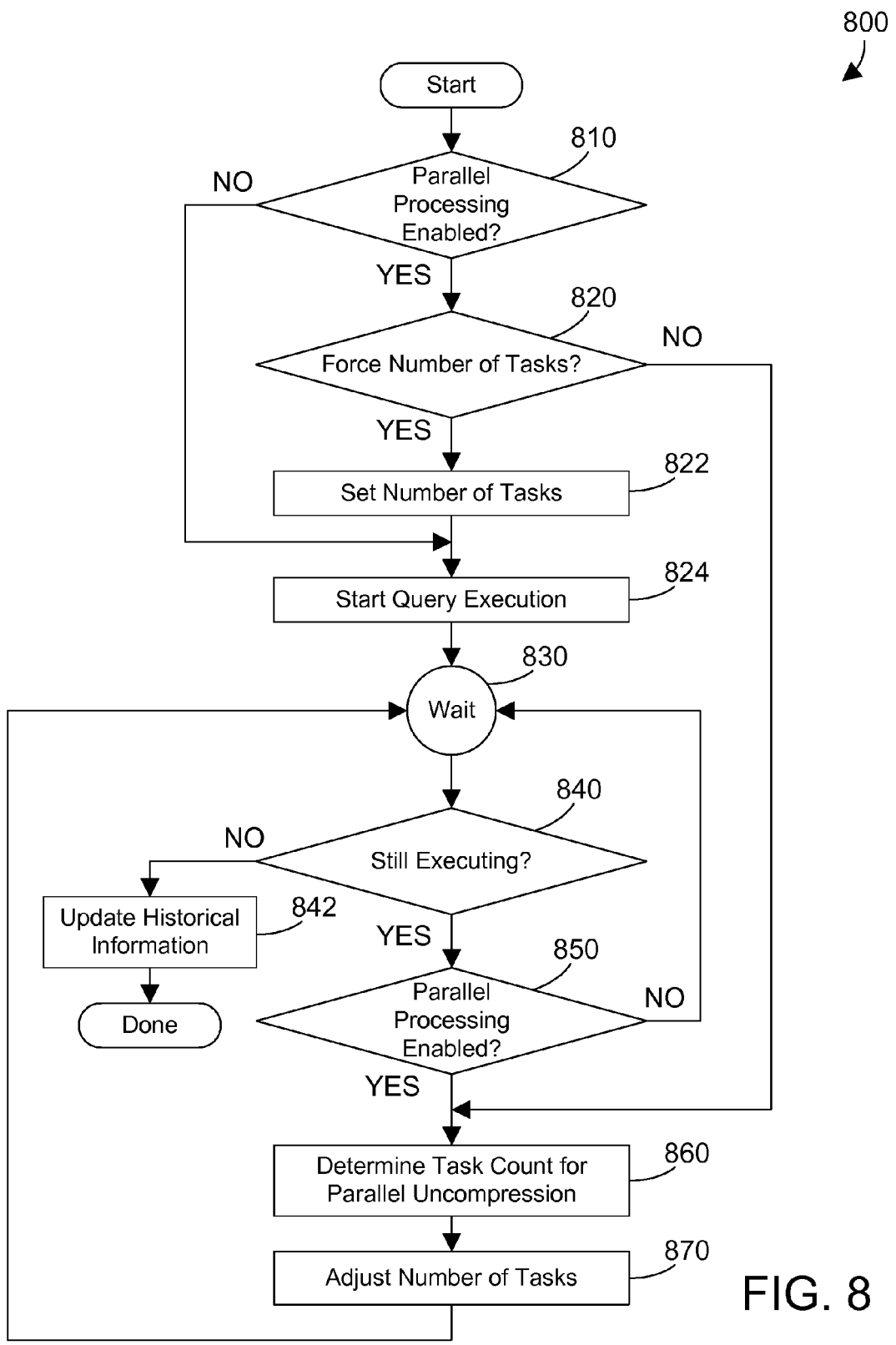
FIG. 8 is a flow diagram of a method for gathering historical information after a query is executed and for setting or determining an appropriate number of tasks to do parallel uncompression of portions that satisfy the query.

Referring to FIG. 8, a method 800 is preferably performed by multiprocessing uncompression mechanism 126 in FIG. 1. Method 800 begins by determining whether parallel processing is enabled (step 810). In the case of a DB2 database system that includes Symmetric Multiprocessing, parallel processing is enabled in step 810 if the symmetric multiprocessing is turned on. If parallel processing is enabled (step 810=YES), method 800 then determines whether to force the number of tasks for parallel uncompression (step 820). If the force select column 716 or the force where column 718 in FIG. 7 specify a number of tasks, this means the number of tasks is forced (step 820=YES). If both the force select column 716 and the force where column 718 are zero, this means the number of tasks is not forced (step 820=NO), so control passes to step 860. If the number of tasks are forced (step 820=YES), the number of tasks is set (step 822). At this point execution of the query is started (step 824). Method 800 waits in step 830, then determines whether the query is still executing (step 840). If not (step 840=NO), the historical information is updated to include the query that was just executed (step 842). If the query is still executing (step 840=YES), and if parallel processing is enabled (step 850=YES), the task count for parallel uncompression is determined (step 860), and this number may then be adjusted as needed (step 870). Method 800 then returns to step 830 until the query is no longer executing (step 840=NO), at which point the historical information for the query that was just executed is updated (step 842) and method 800 is done.

Figure 9:
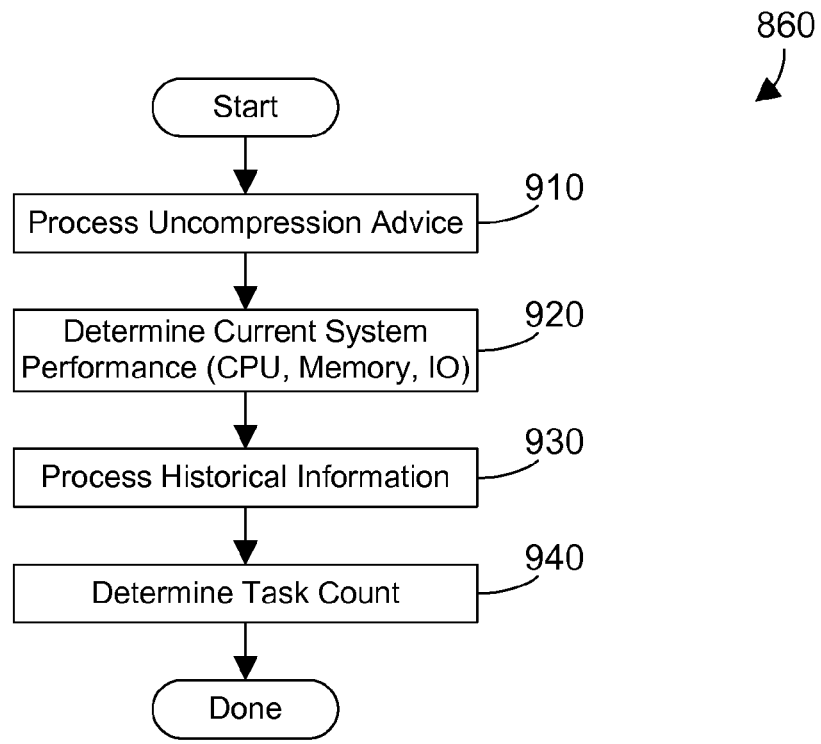
FIG. 9 is a flow diagram of one specific implementation for step 860 in FIG. 8.

One suitable implementation for step 860 in FIG. 8 is shown as method 860 in FIG. 9. Method 860 is preferably performed by task count mechanism 129 in FIG. 1. Method 860 processes the uncompression advice (step 910), such as uncompression advice 128 in FIG. 1 and uncompression advice table 700 in FIG. 7. The uncompression advice is processed in step 910 to determine the user-specified parameters in the advice that are used to determine the appropriate number of tasks for parallel uncompression. The current system performance is then determined (step 920). Examples of metrics used to measure current system performance include CPU utilization, memory utilization, and IO utilization. The historical information for the query is then processed (step 930). At this point method 860 has all the information it needs to make a decision regarding an appropriate number of tasks for parallel uncompression, so the task count is determined (step 940). Note the task count in step 940 may include one or more tasks for things other than parallel uncompression, or may be dedicated to parallel uncompression.

Figure 10:
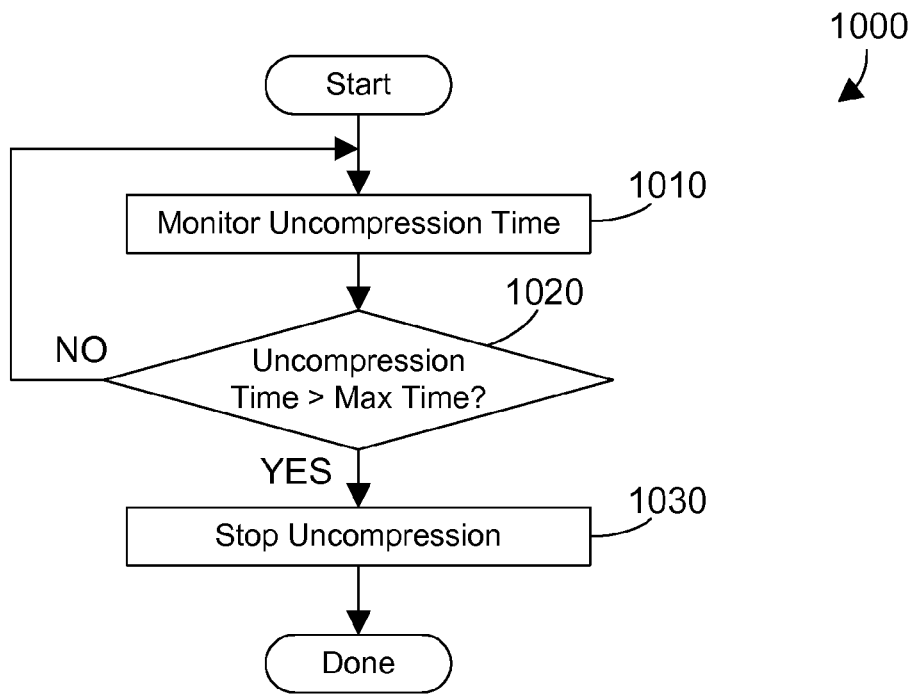
FIG. 10 is a flow diagram of a method for stopping uncompression if the time required for uncompression exceeds a specified maximum time.

Referring to FIG. 10, a method 1000 is shown as one possible example that stops parallel uncompression if the uncompression time exceeds a specified maximum time, such as 732 in FIG. 7. The uncompression time is monitored (step 1010). If the uncompression time is less than or equal to the threshold specified in the maximum time column 732 (step 1020=NO), method 1000 loops back to step 1010 and continues. If the uncompression time exceeds the maximum time (step 1020=YES), the parallel uncompression is stopped (step 1030). While method 1000 in FIG. 10 is shown as one specific example that stops uncompression when the uncompression time exceeds a specified threshold maximum time, one skilled in the art will recognize that similar methods could be derived for any of the CPU thresholds 720 and 726, memory thresholds 722 and 728, IO thresholds 724 and 730, maximum time 732, or any suitable combination or heuristic that involves these thresholds. Such methods could simply stop parallel uncompression to avoid using excessive system resources, or could stop all uncompression and return the results that would include compressed data. The disclosure and claims herein expressly extend to a user specifying any suitable threshold that allows the parallel uncompression to stop once the threshold has been satisfied.

The multiprocessing uncompression mechanism disclosed and claimed herein defines multiple uncompression tasks that may be executed in parallel by an existing database multiprocessing mechanism. The number of uncompression tasks for a particular query depends on historical information relating to one or more past executions of the query, uncompression advise specified by a user, and the current performance of the database system. The uncompression advice may include a threshold that causes uncompression to stop when the threshold is satisfied even if uncompression has not been completed.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
at least one processor;
a memory coupled to the at least one processor;
a database table residing in the memory that includes at least one portion that is compressed and at least one portion that is uncompressed;
a query to the database table;
a multiprocessing mechanism that performs parallel execution of a plurality of tasks in a database system that includes the database table; and
an uncompression mechanism residing in the memory and executed by the at least one processor that analyzes historical information relating to past executions of the query and analyzes uncompression advice that includes at least one parameter specified by a user including a threshold for stopping uncompression if uncompression has not been completed when the threshold is satisfied, and in response to the historical information and the uncompression advice, determines a count of uncompression tasks that perform uncompression of at least one portion of the database table that satisfies the query, the uncompression tasks being included in the plurality of tasks executed in parallel by the multiprocessing mechanism.

2. A computer-implemented method for uncompressing in parallel multiple compressed portions of a database table, the method comprising the steps of:
(A) providing at least one processor;
(B) providing a memory coupled to the at least one processor;
(C) enabling parallel execution of a plurality of tasks in a database system that includes the database table;
(D) executing a query to the database table;
(E) analyzing historical information relating to past executions of the query;
(F) analyzing uncompression advice that includes at least one parameter specified by a user including a threshold for stopping uncompression if uncompression has not been completed when the threshold is satisfied;
(G) determining a count of uncompression tasks that perform uncompression of at least one portion of the database table that is compressed that satisfies the query, the uncompression tasks being included in the plurality of tasks in step (C); and
(H) the database system using existing parallelism to execute the plurality of tasks that include the uncompression tasks.

3. A computer-implemented method for uncompressing in parallel multiple compressed portions of a database table, the method comprising the steps of:
(A) providing at least one processor;
(B) providing a memory coupled to the at least one processor;
(C) enabling parallel execution of a plurality of tasks in a database system that includes the database table;
(D) executing a query to the database table;
(E) determining a count of uncompression tasks that perform uncompression of at least one portion of the database table that is compressed that satisfies the query, the uncompression tasks being included in the plurality of tasks in step (C), the count of uncompression tasks being determined by performing the steps of:
analyzing historical information relating to past executions of the query;
analyzing uncompression advice that includes at least one parameter specified by a user, wherein the uncompression advice specifies a threshold for stopping uncompression if uncompression has not been completed when the threshold is satisfied; and
determining performance of the database system comprising CPU utilization, memory utilization, and IO utilization;
wherein the count of uncompression tasks is selected according to the historical information, uncompression advice, and performance of the database system;
(F) the database system using existing parallelism to execute the plurality of tasks that include the uncompression tasks;
(G) stopping uncompression when the threshold has been satisfied; and
(H) returning results of the query, wherein the results of the query include at least one portion that is compressed and at least one portion that is uncompressed.

4. An article of manufacture comprising:
an uncompression mechanism that analyzes historical information relating to past executions of a query to a database table and analyzes uncompression advice that includes at least one parameter specified by a user including a threshold for stopping uncompression if uncompression has not been completed when the threshold is satisfied, and in response to the historical information and the uncompression advice, and determines a count of uncompression tasks that perform uncompression of at least one portion of a database table that satisfies a query, the uncompression tasks being included in a plurality of tasks executed in parallel by a multiprocessing mechanism; and computer-readable media bearing the uncompression mechanism that includes instructions that, when executed by at least one processor, perform the functions of the uncompression mechanism.

* * * * *